United States Patent Office 3,429,176
Patented Feb. 25, 1969

3,429,176
CHROMATOGRAPHIC EQUIPMENT SAFE FOR
USE IN HAZARDOUS ATMOSPHERES
William Henry Topham, Chattenden, Rochester, Kent,
England, assignor to The British Petroleum Company
Limited, London, England, a corporation of England
Filed July 14, 1965, Ser. No. 471,938
Claims priority, application Great Britain, July 15, 1964,
29,079/64, Pat. No. 1,111,442
U.S. Cl. 73—23.1                                    10 Claims
Int. Cl. G01n 31/08

ABSTRACT OF THE DISCLOSURE

A chromatographic analyzer which is inherently safe in hazardous atmospheres and does not require an explosion-proof housing is provided, which comprises segregating all electrical connections and other potential sources of ignition from the sample, the sample carrier gas and the ambient atmosphere, and utilizes a heater which is incapable of raising the temperature of the non-segregated components to the ignition temperature of the ambient atmosphere.

---

This invention relates to apparatus for use in chromatography, particularly gas chromatography.

Gas chromatography is a convenient, speedy and accurate method of analysis which has been widely used in laboratories in recent years to an ever increasing extent. In general, the atmosphere in laboratories is not hazardous and accuracy and versatility are therefore the prerequisites of such laboratory instruments. These factors are reflected in the design of most commercial chromatographs which are complex, bulky, expensive, and, while safe for use in the laboratory, are not safe for use in potentially hazardous atmospheres such as may be found on industrial plant, for example on hydrocarbon distillation units.

In view of the success of chromatographs in the laboratory, attempts have been made to employ chromatographs on plant duties. Such attempts have not been entirely satisfactory for the above reasons. In a potentially hazardous atmosphere safety must be the first consideration. In known chromatographs, it has been the practice to assemble the electrical and mechanical components of a field-mounted analyser unit and to mount them inside an overall enclosure. This enclosure which surrounds a large vapour space containing both sources of explosive gases and electrical ignition is potentially dangerous. For this reason, known analyser unit housings are rendered explosion-proof, flame-proof or are air purged. This increases the bulk and cost of the equipment and can hamper maintenance work. Furthermore, explosion-proof and flame-proof constructions merely contain an explosion if such should occur and do not eliminate the risk of explosion.

It is the primary object of the present invention to provide a chromatograph which is inherently safe for industrial use in hazardous atmospheres.

The apparatus according to the invention has been developed particularly for the analysis of refinery gases and liquified gaseous streams consisting of paraffins and/or olefins in the range methane to normal pentane, hereinafter referred to as liquified petroleum gases (LPG).

It is a further object of the present invention to provide a chromatograph in which the electrical components are segregated from possible sources of hazardous gases and in which a "safe low temperature heater" concept is used, as will be explained later.

Chromatographic apparatus in accordance with the present invention includes an analyser unit comprising a metal block, a chromatographic column disposed around the block and arranged to receive a sample to be analysed, said block being arranged to be heated by a heat source which is incapable of raising the temperature of the block to the ignition temperature of the atmosphere surrounding the block and being provided with a first well in fluid communication with the outlet from said column and arranged to receive a sample detector therein, and screening means having sealing connection with said block and arranged to enclose and completely segregate potential sources of ignition associated with the analyser unit from the sample, sample carrier gas when used, and the ambient atmosphere.

Preferably, the screened enclosure is provided with inlet and outlet connections for the supply and removal of a noncombustible purging gas.

According to a preferred embodiment of the invention the screening means comprises a housing securable to a base plate below which and to which said block is mounted in substantially concentric relationship with sealing means disposed between said block and base plate at least around the periphery of said block.

The screening means is completed by the detector being sealed into the well, this sealing arrangement preferably comprising a mechanical seal, such as a bolt and washer, and a resin seal arranged to completely cover the mechanical seal.

Preferably, the block is provided with a second well which also receives a detector in a gas-tight sealed manner therein, this second well being connected to the carrier gas supply whereby the detector serves as a reference detector. The two detector elements are connected as opposing arms in a Wheatstone bridge network and unbalance signals caused by the detection of the sample components are transmitted to a recorder which is preferably of the strip chart form. This presentation technique provides an easily visible and accurate method of assessing the composition of the sample and can be adjusted easily for any particular sample.

In order that the invention may be more readily understood, reference should be made to the following detailed description which is given by way of example and in conjunction with the accompanying drawings, in which.

A complete gas chromatograph consists of an analyser unit for analysing a gas or vapour conveyed by a carrier gas, a control unit, a recording system and a sampling system for providing the required samples for analysis. The present invention is concerned particularly with the analyser unit, although reference to the other parts of the complete chromatograph will be given where necessary.

Figure 1:
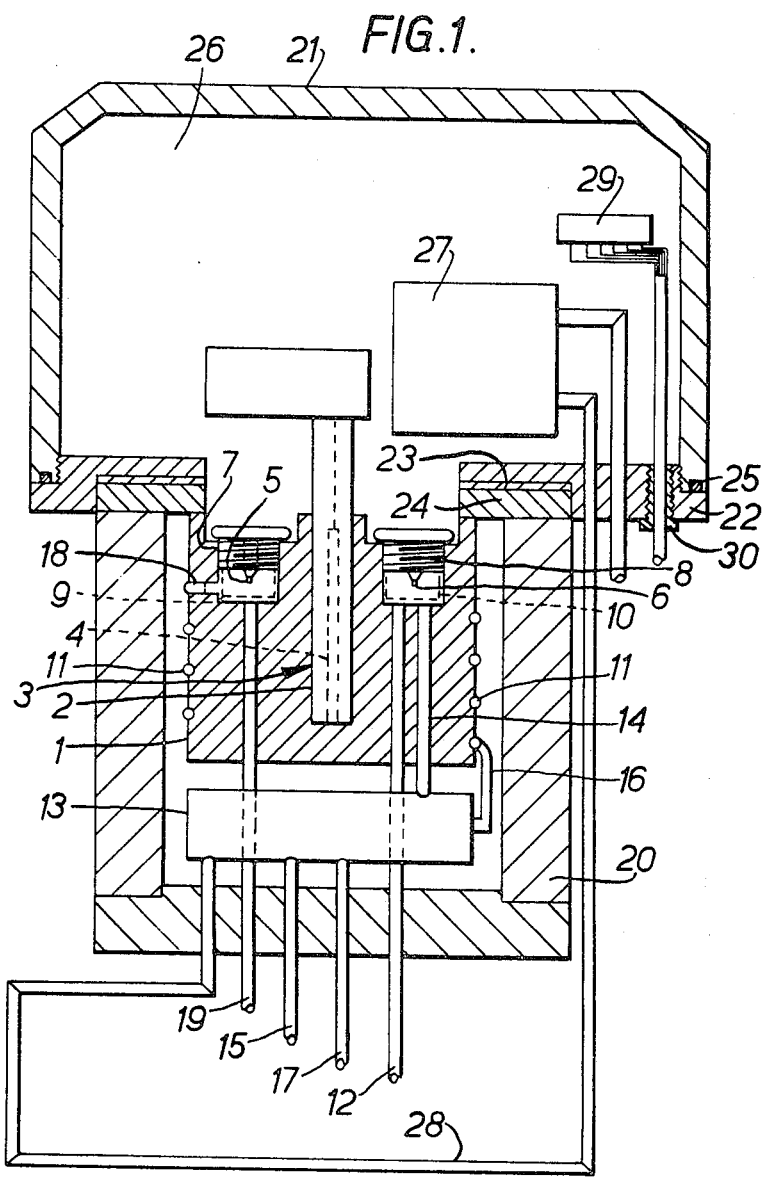
FIG. 1 is a schematic sectional view of one embodiment of chromatographic analyser unit in accordance with the invention.

Referring first to the embodiment illustrated in FIG. 1, this comprises an essentially cylindrical metal block 1 which can suitably be made of duralumin or brass. This metal block is arranged to be heated and maintained at a constant temperature by means of a cartridge heater 3 inserted in a passage 2 in the block and a htermostat 4. The thermostat 4 controls the operation of the heater 3 such that the temperature of the block is always maintained at a predetermined value. The present invention employs a "safe low-temperature heater" principle which ensures that even if the thermostat were to become inoperative the maximum temperature to which the block could rise would be considerably less than the temperature at which a gas ignition hazard occurs. In other words, the maximum heat input capacity of the heater is greater than that required to maintain the block at the desired temperature but is not sufficient to raise the temperature of the block to a dangerously high level. In the case of light hydrocarbon gas mixtures, for which the analyser according to the invention is particularly useful, a minimum temperature of 250° C. is required in order to ignite a hydrocarbon/air mixture. The temperature of the block can therefore be arranged to be maintained at any value between ambient and approximately 120° C. depending upon sufficient heat capacity being available, but as retention times in the column increase at relatively low temperatures and separation becomes more difficult at relatively high temperatures, a constant temperature of between 40° C. and 75° C. is preferable, choice of the particular value depending upon the ambient temperature to a large degree.

Two thermal conductivity hot-wire detectors 5 and 6 are screwed in tightly sealing manner into threaded wells 7 and 8 respectively drilled in the top surface of the block 1. Each of the wells 7 and 8 may contain a wire gauze flame trap 9 and 10 respectively, as an added safety precaution.

Around the outside of the metal block 1 is wound a chromatographic column 11. This column is preferably of copper, stainless steel or aluminium and the coils are tightly wound to ensure good thermal contact with the block. The column 11 is conveniently about ¼ inch outside diameter with a 3/16 inch bore packed with 30% squalane on Celite or firebrick, and about 20 feet in length. Such a column can be used to resolve components such as, for example, ethane, propane, butanes and pentanes, although the actual dimensions and packing are determined by the particular range of components, by the size of the sample, and by the analysis time required.

Carrier gas, preferably hydrogen, for conveying the sample is supplied to the well 8 by way of a pipe and passageway 12 through the block 1. It passes over the detector 6 which serves as a reference detector responsive to the carrier gas alone, and flows to a sample injection valve 13 which may be of the slide-valve type, or of the type disclosed in copending British patent application No. 32,418/64, by way of a passageway 14 through the block. A gaseous sample of the material to be analysed is also fed from a sampling system (not shown) to the sample injection valve 13 through a pipe 15, and this sample is then caused to flow, together with the carrier gas, from the valve 13 to the bottom of the chromatographic column 11 by way of a pipe 16. A sample outlet pipe 17 is also provided leading from the valve 13 for conducting away excess sample gas not entrained by the carrier gas. The sample and carrier gases flow up the column 11 and thence by way of a passageway 18 drilled radially in the block 1 to the well 7 contaning detector 5 which acts as a measuring detector. The gases in the well 7 then flow down through a venting passageway 19 drilled in the block and out to a discharge point (not shown).

The block 1 and its associated components together with the sample injection valve 13 are enclosed in a thermal lagging jacket or container 20 which affords protection against external weather or atmospheric conditions and which helps to maintain the block 1 at its predetermined constant temperature.

A metal cover 21 is arranged to enclose the upper surface of the block 1. This cover 21 is screwed to a metal base plate 22, and an O-ring seal 25 is provided to ensure a gas-tight seal between these two parts. Between the upper surface of the block 1 and the base plate 22 is provided a washer 23 of a weather and corrosion-resistant synthetic plastics material and a fibre disc 24 to act together as a seal. The block 1 can be secured to the base plate 22 by any suitable clamp means (not shown) and the thermal lagging jacket 20 can also be secured by clips (not shown) to the base plate 22. The cover 21 thus encloses a space 26 above the block 1 which is sealed in a gas-tight manner from the ambient atmosphere, from the sample gas, and from the carrier gas.

Within the sealed space 26 defined by the cover 21 are provided all the electrical connections and components necessary for the operation of the analyser unit. These include a solenoid valve 27 which controls the compressed air supply which serves to actuate the injection valve 13 and which is fed thereto through a pipe 28. The space 26 also contains a terminal block 29 to which all the electrical connections to the detectors 5, 6, the heater 3 and the thermostat 4 are made, and to and from which electrical leads enter and leave the analyser unit, such as from and to the recorder and control unit, by way of a flame-proof connector 30 mounted through the base plate 22.

The two thermal conductivity detectors 5 and 6 are arranged as opposing arms in a Wheatstone bridge circuit which forms part of the control unit, further details of which will be given later. Any unbalance of the bridge due to a change in conductivity between the reference and sample detectors gives rise to an output signal which produces a chromatogram on the recorder, from which the composition of the sample can be determined.

Reference will now be made to the preferred embodiment of the invention which is shown in FIGS. 2–5. Basically, this embodiment is similar to that illustrated in FIG. 1. Again, the unit is formed around a cylindrical metal block 40 which is preferably of an aluminium alloy such as duralumin and which is maintained at a predetermined constant temperature by means of a heater 41 and a thermostat 42. The heater 41 is preferably a cartridge heater of suitable rating and the thermostat 42 can be of the bimetallic type. The heater 41 is placed in a drilled hole in the block 40 and the thermostat 42 is secured to the upper surface of the block, so as to control the temperature of the block in accordance with the "safe heater" principle mentioned above. It should be pointed out that although the temperature of the block 40 must be maintained constant within quite strict limits, this temperature need not necessarily be uniform throughout the block. Preferably, the upper surface of the block is covered with removable lagging to act as heat insulation.

Two thermal conductivity hot-wire detectors 43 and 44 are provided in wells 45 and 46 respectively, formed in the upper surface of the block 40. These detector elements 43 and 44 are double-sealed in their wells by means of tubular bolts 47, 48 and sealing rings (not shown) of a suitable semiresilient material such as polytetrafluoroethylene, the whole detector assembly being coated with a bonding resin to provide the double seal and to protect against any possible leakage from the wells 45, 46. The centres of the tubular bolts are also filled with the resin to prevent hydrogen ingress to the top enclosure in the event of breakage of the detector glass-to-metal seal at the point where the leads pass through.

Around the outside of the block 40 are wound a stainless steel preheating coil 49 for carrying the sample gas, a copper preheating coil 50 for carrying the carrier gas, and a copper chromatographic column 51 packed with a suitable material such as 30% squalane on Celite or firebrick. All these coils are tightly wound on the block 40 to ensure good thermal contact with the block. The sample gas from the sampling system is passed to a sample inlet 52 on a side panel 53 and thence through a filter 54 to the preheating coil 49. From thence it is fed to a sample injection valve 55 which is mounted on a bracket bolted to the block 40. This valve may comprise a 6-port injector of the slide-valve type actuated by an air-operated piston, the air being supplied by way of an air cylinder 56 and a clean air supply controlled by a solenoid valve 57, reference to which will again be made later. Alternatively, the valve may be of the type disclosed in our copending British patent application Ser. No. 32,418/64. The sample injection valve 55 of the 6-port type includes a sample loop 58 which is external to the actual valve body and which may have a sample capacity of, for example, 0.5 ml. The output from the sample loop 58 is taken to a sample flow-meter 59 and thence to a sample outlet pipe 60. The carrier gas, which is preferably hydrogen, is fed from a carrier gas inlet 61 through a filter 62 and a pressure regulator 63 and gauge 64 to the carrier gas preheating coil 50. The coil output connects with a passageway (not shown) drilled radially through the block 40 into the well 45 containing detector 43 which acts as a reference element. The carrier gas then passes from the well 45 through a further passageway in the block and through a connecting pipe to the injection valve 55 where it picks up the gaseous sample held in the loop 58.

The sample which is entrained by the carrier gas is then passed up the chromatographic column 51 which connects at the top with a passageway (not shown) drilled through the block 40 and leading to the well 46 containing the measuring detector element 44. From this well a further passageway drilled through the block enables the carrier gas to pass to a carrier gas outlet 65 and hence to atmosphere.

Figure 2:
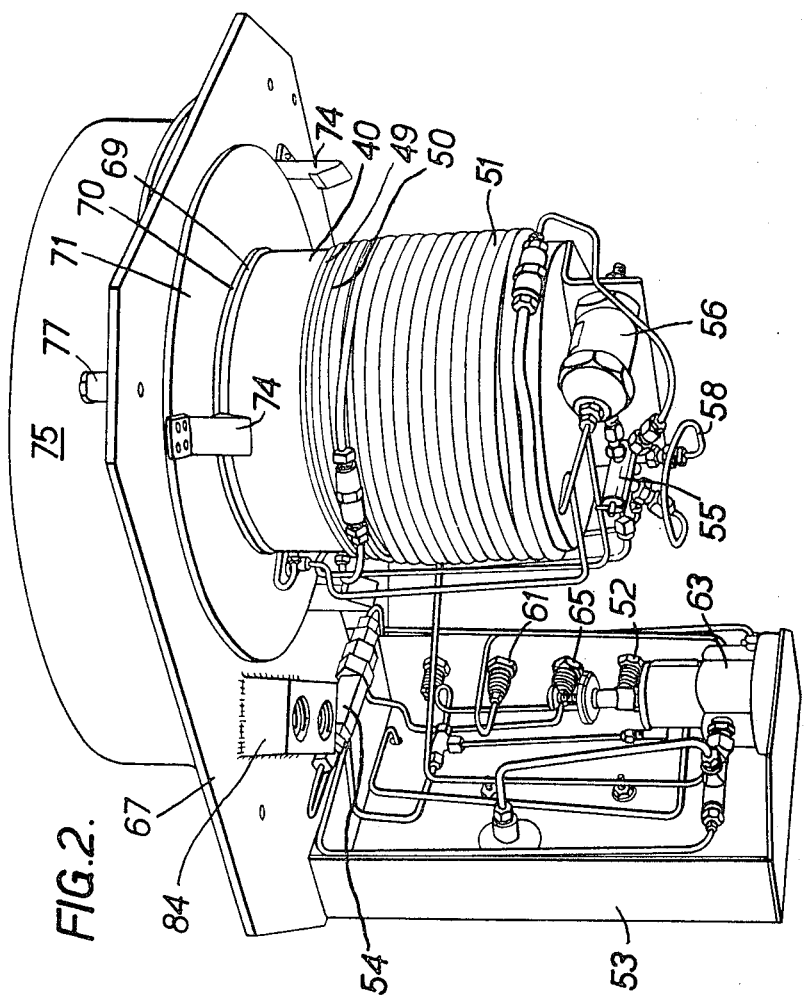
FIG. 2 is a prespective view with the protective heat-insulating cover removed of a modified chromatographic analyser unit according to the invention.
Figure 3:
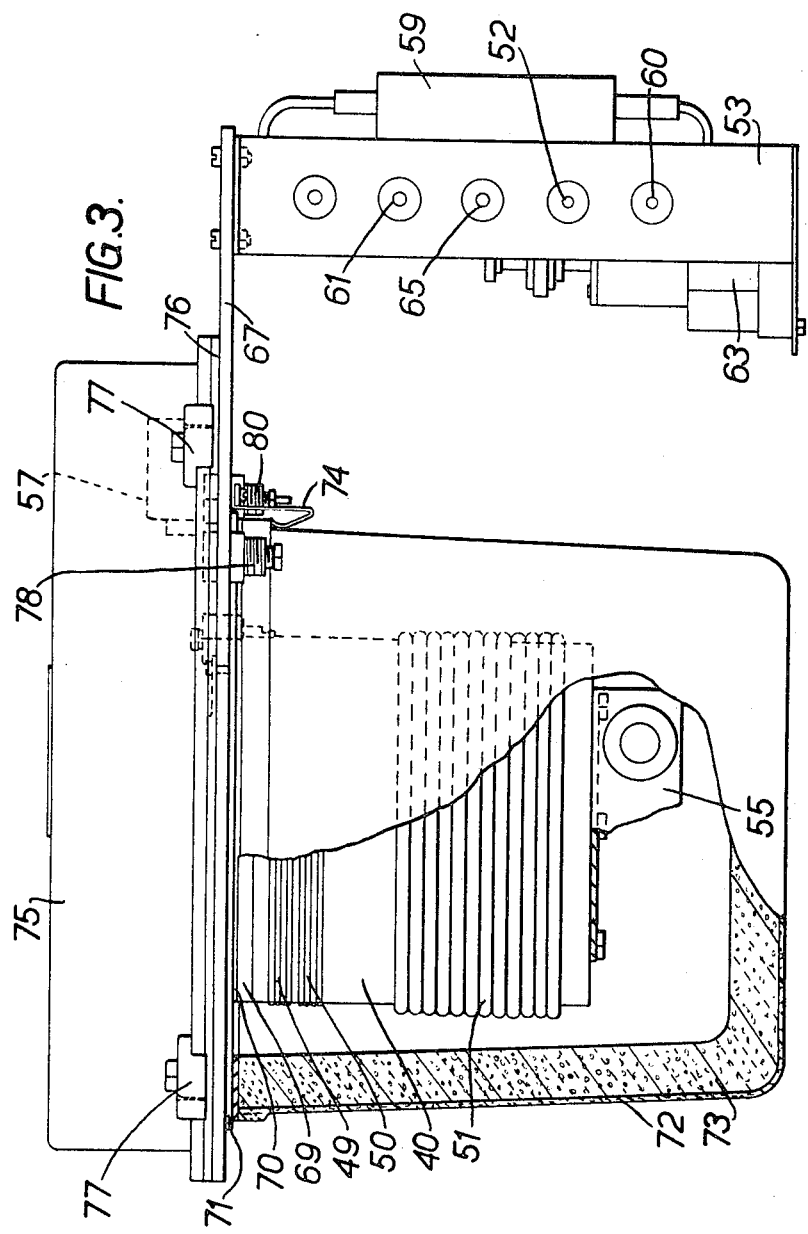
FIG. 3 is a side elevational view, partly in section, of the analyser unit of FIG. 2.
Figure 4:
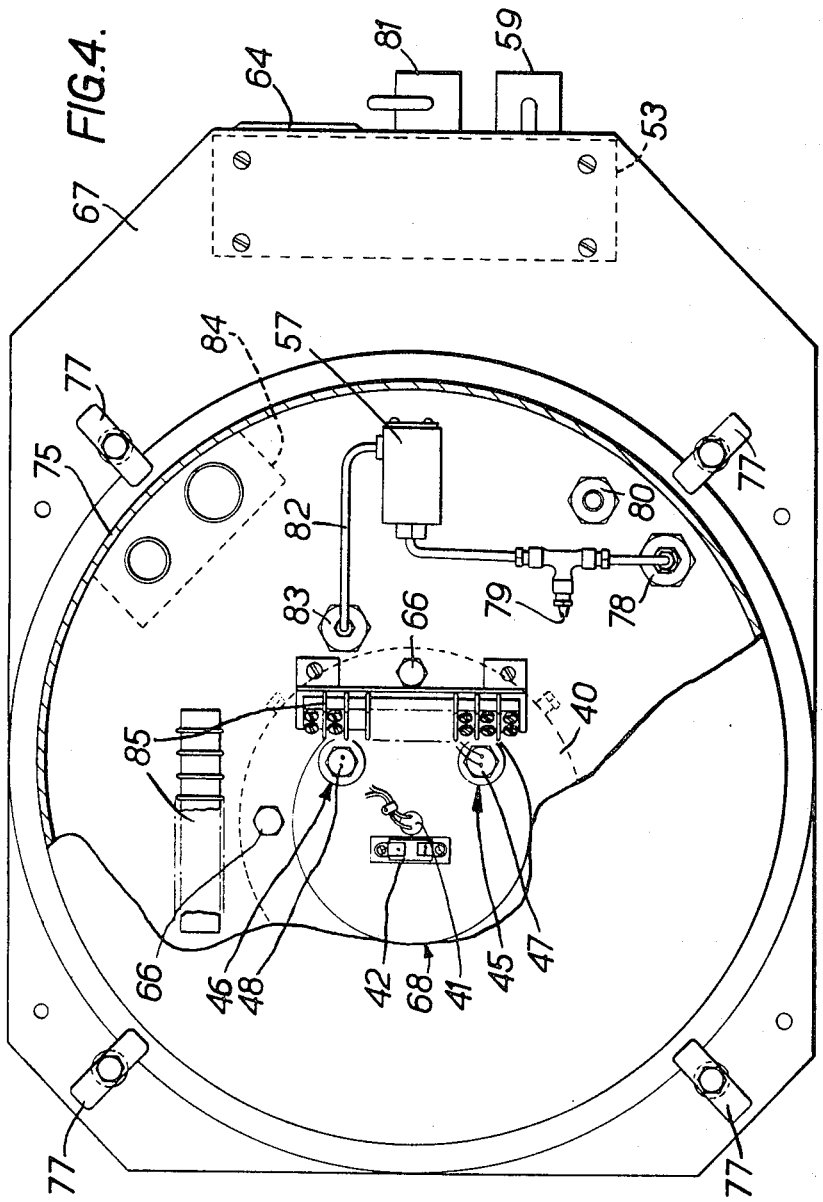
FIG. 4 is a plan view, with parts broken away, of the analyser unit of FIG. 2; and, FIG. 5 is a schematic flow diagram for the analyser unit of FIGS. 2, 3 and 4.
Figure 5:
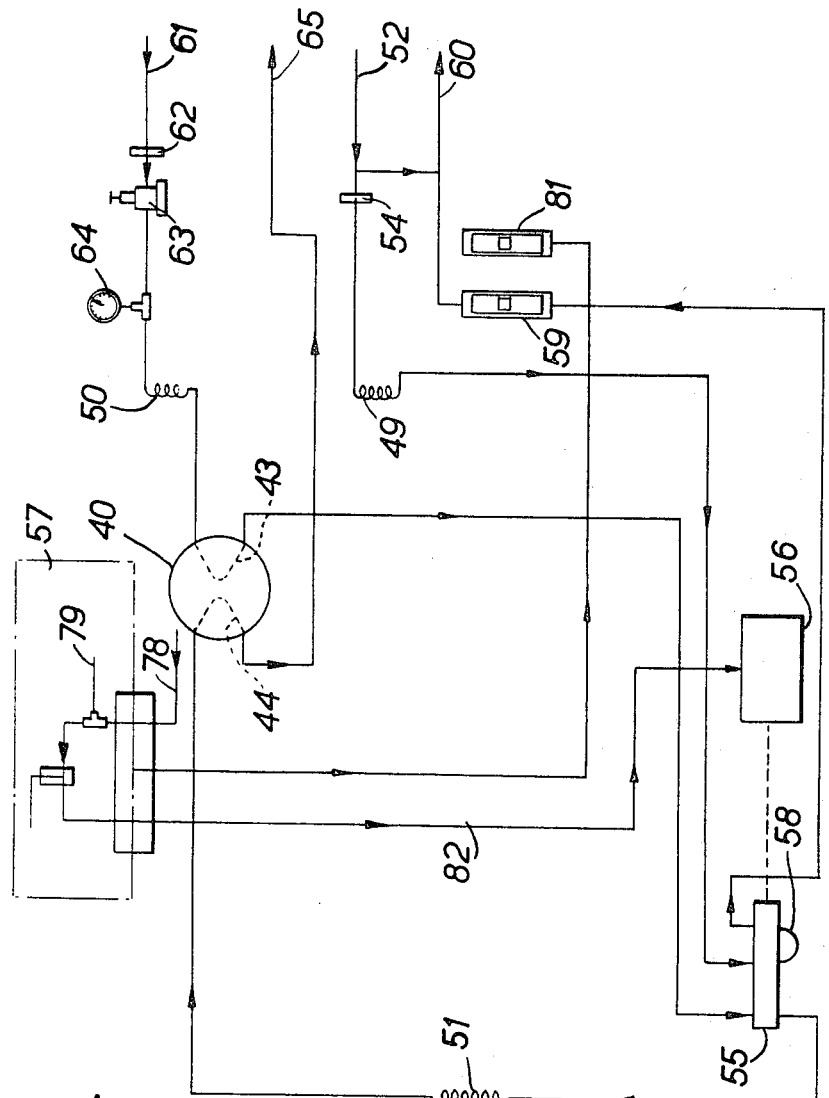

The manner in which all electrical connections are separated from carrier gas, sample gas and ambient atmosphere will now be described in detail with reference particularly to FIGS. 2, 3 and 4. The metal block 40 is secured by means of bolts 66 to a metal base plate 67 on which is also mounted the side panel 53. The base plate 67 has a circular hole 68 (FIG. 4) formed therein immediately above the centre of the block 40 and of a diameter less than that of the block. Between the top of the block 40 and the base plate 67 are provided a disc 69 of a heat-insulating material, a neoprene gasket 70, and a weather-tight seal 71 of a suitable material and of a diameter considerably greater than that of the block 40. A heat-insulating cover 72 is provided around the block 40, the valve 55 and the associated components below the base plate 67. This cover is preferably of moulded fibre glass or like material to give weather protection and preferably has a rigid foam lining 73. It is secured against the large diameter weather-tight seal 71 by means of retaining clips 74. On top of the base plate 67 is provided a flanged metal cover 75 which can be clamped down on to a resilient seal 76 by means of swivel clamps 77 so that the cover 75 provides a gas-tight enclosure. Within this enclosure are mounted the electrical components and connections for the analyser unit. The solenoid valve 57 is mounted in this enclosure and the clean air supply for the valve which enters the enclosure through a sealed entry 78 is also used to purge the enclosure for cleanliness and as an additional safety precaution. A purge air inlet 79 is shown in FIG. 4, the purge air being arranged to flow out of the enclosure by way of a sealed connection 80 to a purge air flow-meter 81 and then to atmosphere. The air supply to the solenoid valve 57 operates the air cylinder 56 which serves as an actuator for the sample injection valve 55, a pipe 82 leading through a sealed connection 83 taking the air from the solenoid valve to the cylinder 56. The solenoid valve 57 is energised from a suitable A.C. supply derived from the control unit, the connecting leads being preferably of the mineral-insulated, metal-sheathed type and arranged to enter and leave the electrical components enclosure through a flame-proof connector 84. Also mounted within the enclosure are terminal strips 85 to which the detector elements and thermostat can be connected. The analyser unit is also connected by mineral-insulated, metal-sheathed cables to the control unit and recorder.

In an alternative arrangement, nitrogen can be used instead of air as the pressurising purging gas, the nitrogen then being used to control the sample injection valve 55 as well. It may be desired to include a purge pressure switch in the purge gas supply line to comply with safety requirements, but even in the event of purge gas supply failure the unit will operate satisfactorily and safely.

The control unit (not shown) for the analyser unit hereinbefore described can be located remote from the analyser unit and includes a stabilised D.C. power supply for the detector elements 43, 44. The two detectors are arranged as opposing arms in a Wheatstone bridge circuit so that unbalance signals indicative of the sample components are transmitted to the control unit and to a recorder (not shown). The control unit also includes the other bridge resistors, controls for bridge zero, sensitivity and current, and a motor-driven cam switch for operating the solenoid valve which controls the injection of a sample at preset intervals. The control unit also preferably includes means for switching the chromatograph on to manual sample injection for use when testing the apparatus.

The recorder used is preferably a strip chart recorder with adjustable chart speed. The complete chromatogram for each sample is displayed on the recorder and all component peaks are preferably shown at the same sensitivity, using no attenuation or gating. This simplifies the operating procedure and ensures that no unexpected components of the sample are missed. The amounts of any large percentage components whose peaks extend off-scale can be calculated by difference.

Since the control unit and recorder only contain electrical components they can be purged for safety in the usual manner, using either air or nitrogen.

If the sample gas itself contains hydrogen, which is normally used as the carrier gas, then air or nitrogen can instead be used as the carrier gas with the detector polarity consequently reversed if a direct reading of the mol percent hydrogen is required. Otherwise the amount of hydrogen can be calculated by difference. The disadvantage of using air or nitrogen as the carrier gas as compared with hydrogen is that the sensitivity of the detector elements to hydrocarbons is thereby greatly reduced.

Any suitable sampling system can be used with the analyser unit described. One embodiment of sampling system comprises a strainer, a pressure reducing valve which with steam heating also acts as a vaporiser for liquid streams, a pressure gauge and a fine-control needle valve. From this latter valve the sample can be piped to the analyser unit using steam heating to prevent condensation if desired. A sample bypass loop is also preferably provided in the analyser unit to bypass, for example, 90% of the total flow.

The analyser unit hereinbefore described is adapted primarily for use with a single stream. This provides the highest frequency of analyses and ensures close quality control. This is essential for closed-loop or servo system control and is also desirable for monitoring or open-loop control. By the use of a simple adapter, however, the analyser can be converted to provide a multistream analyser of simple design.

Various modifications to the units described can be made without exceeding the scope of the invention. For example, a hermetically sealed thermostat can be used to improve the safety of the electrical component enclosure, and means for giving some indication of the analyser block temperature can be provided, such as a liquid-filled or vapour pressure bulb system. In addition, a pressure switch can be fitted in the purge air or nitrogen supply line connected in series with the bridge current supply and a current relay in the control unit. This relay would then switch off all electrical supplies to the analyser unit in the event of purge gas failure.

Although the analyser is primarily adapted for use with gaseous sample streams it can also be used for liquid stream analyses, provided that the sample injection valve is of a type suitable for dealing with liquids.

I claim:
1. A chromatographic analyser unit comprising, in combination, a heating block, a heat source arranged to supply thermal energy to said block, the thermal characteristics of said block and of said heat source being such that the heat source is incapable of raising the temperature of the block to the ignition temperature of the atmosphere surrounding the block, a chromatographic column for receiving a sample to be analysed disposed around said block in intimate thermal contact therewith, a sealed enclosure into which one end of the block is sealed containing electrical connections for the analyser unit and containing other potential sources of ignition associated with the analyser unit and completely segregating such potential sources of ignition from the sample, sample carrier gas when used, and the ambient atmosphere, a sample detector sealed into a well in said one end of said block, an injector mounted outside said enclosure arranged to supply said sample and carrier gas when used to said column, first connection means between said injector and said column, second connection means between said column and said detector well, and third connection means between said detector well and an outlet outside said enclosure.

2. An analyser unit as claimed in claim 1, in which said sealed enclosure comprises a housing securable to a base plate below which and to which said block is mounted in substantially concentric relationship, sealing means being disposed between said block and base plate at least around the periphery of said block.

3. An analyser unit as claimed in claim 2, in which a disc of heat-insulating material is also disposed between said block and said base plate.

4. An analyser unit as claimed in claim 1, in which said sample detector is sealed into said well by a mechanical seal such as a bolt and washer, and a resin seal completely covering said mechanical seal.

5. An analyser unit as claimed in claim 1, in which electrical connection leads to and from the analyser unit are fed through flame-proof connectors to and from terminals disposed within said sealed enclosure.

6. An analyser unit as claimed in claim 1, in which said heat source is a heater disposed in a recess formed in said one end of said block, said heater being arranged to be controlled by a thermostat mounted on the surface of the block.

7. An analyser unit as claimed in claim 1, in which a second well is formed in said one end of said block, said second well having a reference detector sealed in a gas-tight manner therein and being connected to a carrier gas supply.

8. An analyser unit as claimed in claim 7, in which said wells contain wire gauze flame-traps.

9. An analyser unit as claimed in claim 8, in which said detectors are hot-wire thermal conductivity detectors.

10. An analyser unit as claimed in claim 1, in which said block and column are arranged to be enclosed in a removable heat-insulating casing.

References Cited

UNITED STATES PATENTS

| | | | |
|---|---|---|---|
| 2,652,315 | 9/1953 | McEvoy | 73—27 |
| 2,982,123 | 5/1961 | Kindred | 73—23.1 |
| 3,070,989 | 1/1963 | Dueker et al. | 73—23.1 |
| 3,026,712 | 3/1962 | Atwood et al. | 73—23.1 |
| 3,205,701 | 8/1965 | Szonntagh | 73—23.1 |
| 3,276,243 | 10/1966 | Karas | 73—23.1 |
| 2,618,150 | 11/1952 | Willenborg | 73—27 |

OTHER REFERENCES

Dal Nogare and Juvet: Gas-Liquid Chromatography, 1962, John Wiley & Sons, New York, pp. 286 and 287.

RICHARD C. QUEISSER, *Primary Examiner.*

VICTOR J. TOTH, *Assistant Examiner.*